S. CULVER.
Tea and Coffee Pot.
No. 22,278.
Patented Dec. 14, 1858.
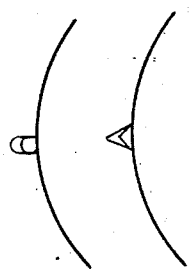
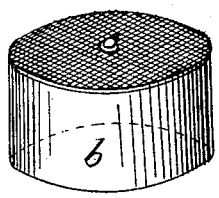
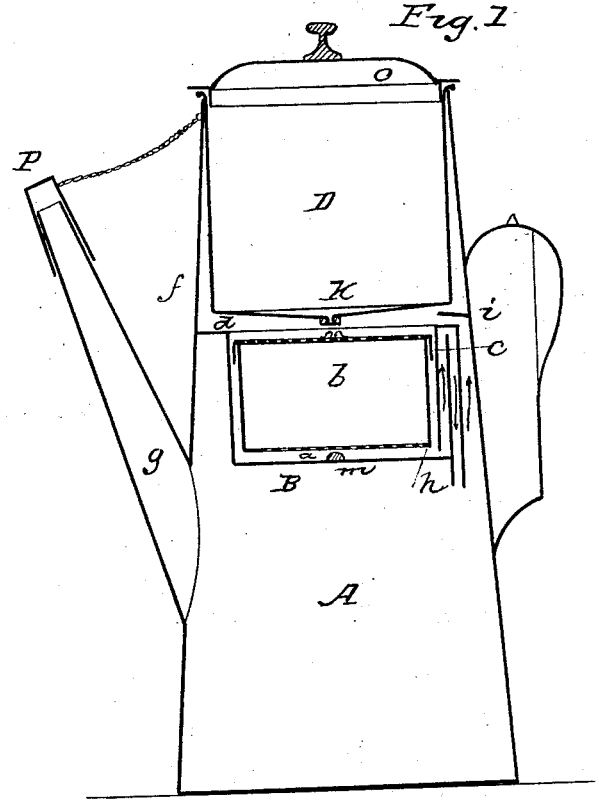
Witnesses
Inventor

UNITED STATES PATENT OFFICE.

STEPHEN CULVER, OF NEWARK, NEW YORK.

TEA AND COFFEE POT.

Specification of Letters Patent No. 22,278, dated December 14, 1858.

*To all whom it may concern:*

Be it known that I, STEPHEN CULVER, of Newark, in the county of Wayne and State of New York, have invented a new and Improved Tea and Coffee Pot; and I do hereby declare that the following is a full, clear, and exact description of the same, reference being had to the annexed drawings, making a part of this specification.

The process of obtaining the extract of tea and coffee by my pot is that of drawing, straining or leaching.

Figure 1 of the drawings is a vertical section of the pot as a whole, the several parts being in place. Fig. 2 is a perspective view of the canister into which is put the material from which the extract is made. Fig. 3 is a horizontal section of the siphon or delivery tube which conducts the extract from the receptacle of the leach to the hold in the lower part of the pot.

A Fig. 1 is the hold of the pot which receives and contains the extract as, and after it passes, from the leach above, depending for its capacity upon the breadth of the lower part of the pot, and upon the height between the bottom of it and the chamber above which may be greater or less as required.

B Fig. 1 is the leach composed of three parts—$a$, a receptacle in which the canister is held, $b$, a canister into which the material from which the extract is made is inclosed, and $c$ a tube or siphon by which the fluid extract is conducted from the receptacle to the hold below.

$d$ Fig. 1 is a diaphragm or partition separating the hold A from the chamber $f$ above. This diaphragm is placed about two thirds of the way between the bottom and top of the pot—is made fast at its periphery to the side of the pot, and may be whole or in sections so that the inner portion together with the receptacle of the leach attached to it, may be removed at pleasure, but experience has proved that it is preferable to have it whole and unremovable. Into this diaphragm the receptacle $a$ of the leach is sunk as is shown in Fig. 1. In the part of it opposite the spout $g$ and in front or nearly so of the handle and next to the side of the pot is an orifice $i$ for the purpose of admitting the steam and vapor from the hold into the chamber $f$. This orifice is thus located to prevent the flow of the liquid from below into the chamber above when the pot is tilted for the purpose of pouring from the spout. Over this orifice is a cap or hood directed centrally for the purpose of conducting the steam and vapor more directly against the bottom of the reservoir D and the stream running from it through the hole $k$.

In the side and near the bottom of the receptacle at $h$ Fig. 1 is an orifice through which the fluid extract passes in its course to the hold below, and which communicates with the tube or siphon $c$ on the outer side of the receptacle. This tube rises to, and is in contact with the under side of the diaphragm $d$ and the curve of it is a little higher than the cover of the canister $b$ Fig. 1. This arrangement is for the purpose of causing the water used in the process of leaching to flood the contents of the canister, to stand in contact with them a much greater length of time than if permitted to run directly through, and for the purpose of causing the fine particles more or less of which become disengaged from the material used and pass the strainer, to be deposited in the bottom of the receptacle $a$ instead of being carried into the hold below.

The outer and longer leg of the tube or siphon $c$ may be wholly dispensed with, without materially affecting the operation of the pot—the only use of it being to withdraw the small quantity of fluid remaining in the receptacle after the supply from the reservoir above ceases. This tube may be made in various ways. A convenient mode is to place a bent or curved piece of metal against the side of the receptacle for the inner and shorter leg and a similarly bent or curved piece over the first mentioned for the longer one, as shown by cross sections in Fig. 3. The inner or shorter leg being always closed at the bottom below the orifice with which it communicates, and for the purpose of forming a caliber always left a little below the other at the top.

$b$ Figs. 1 and 2 is the canister into which the material from which the extract is made is put. Both the bottom and the cover are made of perforated plates as shown in Fig. 2, for the purpose of freely admitting the water applied for leaching, and as freely discharging the extract; and also for the purpose of securely retaining the grounds and preventing their displacement when tilting the pot.

The cover is removable and when the canister is in place as shown in Fig. 1 its upper surface is a little below the bend in the tube c for the purpose of submerging the canister before the liquid begins to flow from the receptacle.

On the bottom of the receptacle is a boss m Fig. 1, to keep the bottom of the canister up a little from the bottom of the receptacle for the purpose of allowing free passage through the strainer, and of furnishing space for sediment. This boss may if preferred be fixed to the bottom of the canister instead of the bottom of the receptacle.

D Fig. 1 is a reservoir for the twofold purpose of holding water for condensing the steam and vapor rising from the hold and of supplying water to the leach. It is placed in the chamber f and made to fit as tightly as may be at the top to prevent the escape of steam and vapor; and to facilitate removing and putting it in place it is made a little smaller at the bottom than at the top as is shown in Fig. 1. In the bottom is a small orifice h Fig. 1 through which the water is delivered for the supply of the leach below. And to prevent rusting and enlargement a thicker piece of metal than that of which the bottom is composed is inserted, through which to make the orifice as shown in Fig. 1. To the reservoir a cover o Fig. 1 is fitted made in the usual way.

To prevent the escape of steam and vapor a cap is fitted to the spout as shown at p Fig. 1.

The several parts of the pot may be made of tin or other fit material.

The manner of using, and the operation of the pot are as follows—The requisite quantity of material from which the extract is to be made is put into the canister and the canister placed in the receptacle. Boiling water is then poured slowly upon the canister until it rises to a level with the cover, at which point it is a little lower than the curve in the siphon and does not bring the siphon into action. The pot is then set aside in some convenient place, not hot, to stand fifteen or twenty minutes to allow the material to drench and steep. About fifteen minutes before the beverage is to be served out the reservoir is filled with boiling water and after sufficient has run into the hold to cover the bottom, the pot is set upon the stove or range, where the contents will be kept hot, but not caused to boil. This charge of hot water takes up and carries out the strength or virtue extracted by the first part of the process—that of soaking or steeping. When the charge of hot water has run off the after charges are repeated with cold water, and the pot set upon the hottest part of the stove or range where the contents in the hold will be caused to boil. At the time the reservoir is charged with cold water, and the contents in the hold caused to boil, the spout being capped, the steam rises through the orifice in the diaphragm and is condensed by contact with the surface of the reservoir and with the stream of water running through its bottom, and falls in drops and is carried into the leach; so that none of the aroma the chief element of fine flavor is lost. At the same time, the steam rising against the leach below and coming in contact with the reservoir and the stream of water as described, serves to raise the temperature of the fluid as it passes the leach and yet does not bring it to the boiling point so as to disengage the acrid and bitter elements which are set free by boiling. The water being supplied to the leach by a small stream not charged with any portion of extract—the canister being kept flooded and its contents thoroughly drenched, sufficient time and opportunity are afforded for extracting all the virtues of the material used. And the extract being caused to rise in the tube on the outer side of the receptacle to nearly the top of it, the sediment, consisting of fine particles which find their way through the strainers of the canister is deposited in the bottom of the leach and is not carried into the hold, so that the beverage is delivered at the spout thoroughly clarified.

What I claim as my invention and desire to secure by Letters Patent is—

1. The leach B, composed of the receptacle a the canister b and the tube or siphon c constructed and arranged substantially as described.

2. The combination of the reservoir D with the leach B substantially in the manner and for the purposes set forth.

3. The diaphragm d with the steam orifice i as specified, and the combination thereof with the receptacle of the leach in the manner and for the purpose described.

STEPHEN CULVER.

Witnesses:
I. E. ROBINSON,
C. L. NORTON.